United States Patent
Kim et al.

(10) Patent No.: US 10,223,949 B2
(45) Date of Patent: Mar. 5, 2019

(54) DISPLAY DEVICE HAVING LEVITATION EFFECT

(71) Applicant: TOVIS CO., LTD., Incheon (KR)

(72) Inventors: Yong Beom Kim, Incheon (KR); Joon Seog Kim, Seongnam-si, Gyeonggi-do (KR)

(73) Assignee: TOVIS CO., LTD., Incheon (KR)

( * ) Notice: Subject to any disclaimer, the term of this patent is extended or adjusted under 35 U.S.C. 154(b) by 0 days.

(21) Appl. No.: 15/531,412

(22) PCT Filed: Dec. 1, 2014

(86) PCT No.: PCT/KR2014/011626
§ 371 (c)(1),
(2) Date: May 26, 2017

(87) PCT Pub. No.: WO2016/085017
PCT Pub. Date: Jun. 2, 2016

(65) Prior Publication Data
US 2017/0316725 A1    Nov. 2, 2017

(30) Foreign Application Priority Data
Nov. 27, 2014  (KR) ........................ 10-2014-0167213

(51) Int. Cl.
| | |
|---|---|
| *G09F 19/18* | (2006.01) |
| *G09F 9/00* | (2006.01) |
| *G06F 3/041* | (2006.01) |

(52) U.S. Cl.
CPC .............. *G09F 19/18* (2013.01); *G06F 3/041* (2013.01); *G09F 9/00* (2013.01); *G06F 2203/04112* (2013.01)

(58) Field of Classification Search
CPC .. G06F 2203/04112; G06F 3/041; G09F 9/35; G09F 19/18
See application file for complete search history.

(56) References Cited

U.S. PATENT DOCUMENTS

| | | | | |
|---|---|---|---|---|
| 5,625,969 | A | * 5/1997 | Vogler | ................ G09F 15/0012 |
| | | | | 40/611.12 |
| 2009/0009477 | A1 | * 1/2009 | Yukawa | ................ G06F 1/1601 |
| | | | | 345/168 |

(Continued)

FOREIGN PATENT DOCUMENTS

| | | |
|---|---|---|
| JP | 2006-259049 A | 9/2006 |
| KR | 10-0251127 B1 | 4/2000 |

(Continued)

OTHER PUBLICATIONS

Kim, Translation of KR20100068675, Jun. 26, 2010 (Year: 2010).*
International Search Report for PCT/KR2014/011626 dated Jul. 28, 2015 from Korean Intellectual Property Office.

*Primary Examiner* — Dmitriy Bolotin
(74) *Attorney, Agent, or Firm* — Revolution IP, PLLC (57) ABSTRACT

A display apparatus having levitation effect comprises: a panel support portion supported by one of a floor, a side wall, and a ceiling; a display panel vertically spaced apart from the panel support portion so as to display an image; a transmission panel made of a transparent material and connecting the display panel to the panel support portion such that a gap between the panel support portion and the display panel is penetrated and visible in a state in which the display panel is levitated; and a transparent electrode attached to the transmission panel and formed in a film form having electric conductivity and light transmission so as to transmit power and signals for driving the display panel from the panel support portion.

12 Claims, 9 Drawing Sheets

(56) References Cited

U.S. PATENT DOCUMENTS

| | | | |
|---|---|---|---|
| 2011/0187666 A1 | 8/2011 | Min | |
| 2012/0105424 A1* | 5/2012 | Lee | G09F 9/35 |
| | | | 345/212 |
| 2013/0162124 A1* | 6/2013 | Miyaoka | H05K 5/0217 |
| | | | 312/223.1 |
| 2015/0138239 A1* | 5/2015 | Kim | G06F 3/1446 |
| | | | 345/634 |

FOREIGN PATENT DOCUMENTS

| | | |
|---|---|---|
| KR | 10-2005-0088720 A | 9/2005 |
| KR | 10-0615049 B1 | 8/2006 |
| KR | 10-2009-0110770 A | 10/2009 |
| KR | 10-2010-0068675 A | 6/2010 |
| KR | 10-2010-0113738 A | 10/2010 |
| KR | 10-2012-0035803 A | 4/2012 |
| KR | 10-2013-0091428 A | 8/2013 |

* cited by examiner

DISPLAY DEVICE HAVING LEVITATION EFFECT

CROSS REFERENCE TO PRIOR APPLICATIONS

This application is a National Stage Application of PCT International Patent Application No. PCT/KR2014/011626 filed on Dec. 1, 2014, under 35 U.S.C. § 371, which claims priority to Korean Patent Application No. 10-2014-0167213 filed on Nov. 27, 2014, which are all hereby incorporated by reference in their entirety.

TECHNICAL FIELD

The present invention relates to a display apparatus for displaying an image.

BACKGROUND ART

In general, a display apparatus is an apparatus for displaying an image by receiving image signals provided from an external device. The display apparatus is installed in such a way to be supported on a floor or attached to a wall such that a user may easily view the image.

However, when the display apparatus is installed so as to be vertically spaced apart from the floor, connection lines for supplying signals or power to the display apparatus from the external device providing the image are stretched outward. For this reason, there are problems in that an aesthetic appearance is deteriorated, and particularly, game concentration is lowered when the display apparatus is used as a monitor for a game console.

To resolve the above problems, the related art discloses a tablet type display apparatus which has a battery for supplying power and is capable of transmitting and receiving an image by wireless. Thus, the display apparatus may be installed on a pedestal without connection lines.

However, there is a limit to the size of the conventional display apparatus which may be supported by the pedestal due to increase in the weight of the battery according to increase in the size of the display apparatus. Furthermore, there is a problem in that the display apparatus may not be continuously driven for 24 hours due to charging characteristics of the battery.

In addition, there are problems in that image quality is deteriorated due to non-uniform wireless signals when an image is received by wireless and production cost required to develop a wireless image input/output board and firmware for receiving the image by wireless is increased.

RELATED ART DOCUMENTS

[Patent Document 1] Document 1: Korean Patent Laid-Open Publication No. 10-2010-0113738 (Oct. 22, 2010)
[Patent Document 2] Document 2: Korean Patent Laid-Open Publication No. 10-2013-0091428 (Aug. 19, 2013)
[Patent Document 3] Document 3: Korean Patent Publication No. 10-0251127 (Apr. 15, 2000)
[Patent Document 4] Document 4: Korean Patent Publication No. 10-0615049 (Aug. 25, 2006)

DISCLOSURE

Technical Problem

Therefore, the present invention has been made in view of the above problems, and it is an object of the present invention to provide a display apparatus having levitation effect, capable of achieving improvement in exhibition and promotion and increase in image concentration by making an impression as if the display apparatus is visually levitated, achieving continuous driving for 24 hours, preventing deterioration of image quality due to non-uniform transmission of image signals, and reducing production cost.

Technical Solution

In accordance with an aspect of the present invention, the above and other objects can be accomplished by the provision of a display apparatus having levitation effect including a panel support portion supported by one of a floor, a side wall, and a ceiling, a display panel vertically spaced apart from the panel support portion so as to display an image, a transmission panel made of a transparent material and connecting the display panel to the panel support portion such that a gap between the panel support portion and the display panel is penetrated and visible in a state in which the display panel is levitated, and a transparent electrode attached to the transmission panel and formed in a film form having electric conductivity and light transmission so as to transmit power and signals for driving the display panel from the panel support portion.

The transparent electrode may include a power electrode for supplying the power to the display panel, and a signal electrode for providing the signals to the display panel.

The transparent electrode may further include a ground electrode for grounding the display panel.

The transparent electrode may further include a touch electrode for generating a touch signal during contact with a portion, at which the display panel is installed, or the transmission panel.

One of the power electrode, the signal electrode, and the ground electrode may include a touch pattern portion which generates and transmits a touch signal during contact.

Two or more electrodes of the power electrode, the signal electrode, the ground electrode, and the touch electrode may be formed in a film form, and be stacked and bonded by a light transmission adhesive.

The transparent electrode may be attached to the entirety of a remaining portion except for a portion to which the display panel is attached in the transmission panel or be attached to the entirety of one surface of the transmission panel, in order to increase an amount of current provided to the display panel.

The transparent electrode may be made of one conductive material of indium tin oxide (ITO), fluoride tin oxide (FTO), metal mesh, metal nanowire, carbon nanotube (CNT), conductive polymer, and grapheme, and be formed with a conductive pattern.

The display apparatus may further include a beam projector which projects an image on a remaining portion except for a portion to which the display panel is attached in the transmission panel.

Advantageous Effects

In accordance with the present invention, a display panel is installed to a transmission panel so as to be spaced apart from a floor and signals and power provided to the display panel are supplied through a transparent electrode. Therefore, it may be possible to focus public eyes by visually providing an aesthetic appearance as if the display panel is levitated from the floor and to increase concentration on image viewing since connection lines provided to the display panel are invisible.

In addition, since a drive circuit substrate for driving the display panel is moved and installed to a panel support portion, a thin display apparatus may be provided and a large display panel may also be easily levitated and supported due to reduction in weight thereof.

In addition, the display apparatus may continuously provide an image for 24 hours by direct supply of power. Furthermore, it may be possible to prevent deterioration of image quality due to non-uniform wireless signals since signals indicative of an image are directly transmitted to the display apparatus from an external device and the image is displayed by the display apparatus.

In addition, sine the display apparatus may be easily manufactured using a ready-made display apparatus, it may be possible to reduce production cost required to develop a wireless image signal input/output board and firmware.

In addition, it may be possible to improve an event effect and interest by providing different images due to installation of a beam projector in addition to the display panel.

DESCRIPTION OF DRAWINGS

The above and other objects, features and other advantages of the present invention will be more clearly understood from the following detailed description taken in conjunction with the accompanying drawings, in which.

DESCRIPTION OF REFERENCE NUMERALS

100: display apparatus having levitation effect, 110: panel support portion

120: display panel, 130: transmission panel

131: beam projection portion, 140: transparent electrode

140*a*, 141*a*, 143*a*, 145*a*: conductive pattern, 140*b*: touch pattern portion

141: power electrode, 143: signal electrode

145: ground electrode, 147: touch electrode

149: connection substrate, 150: light transmission adhesive

160: beam projector

Best Mode

Hereinafter, embodiments of the present invention will be described with reference to the accompanying drawings.

First, the present invention relates to a display apparatus having levitation effect 100 in which a display for displaying an image is visible so as to be levitated, and the present invention may be applied to a display apparatus for the purpose of exhibition and promotion, a display apparatus of a game console, or the like.

Figure 1:
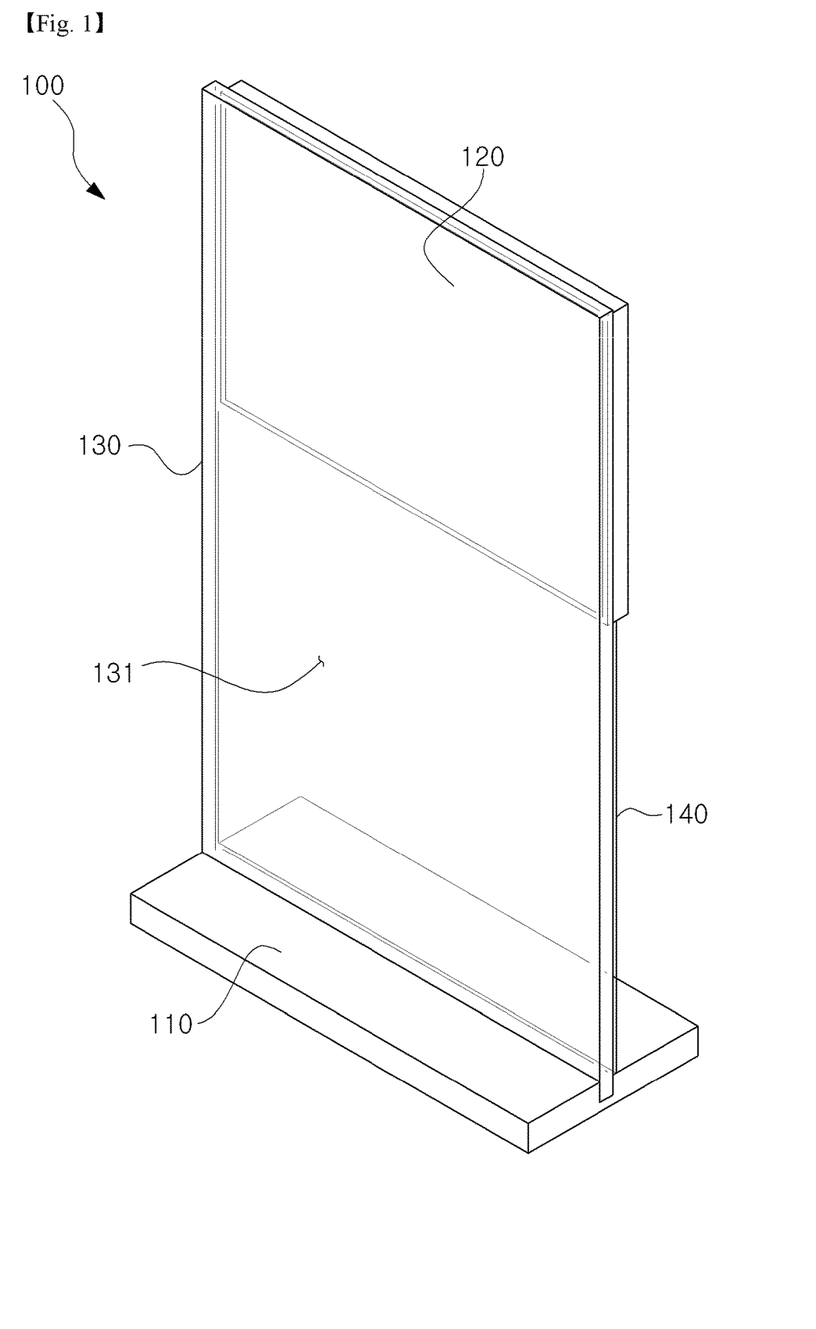
FIG. 1 is a perspective view illustrating a display apparatus having levitation effect according to an embodiment of the present invention.
Figure 2:
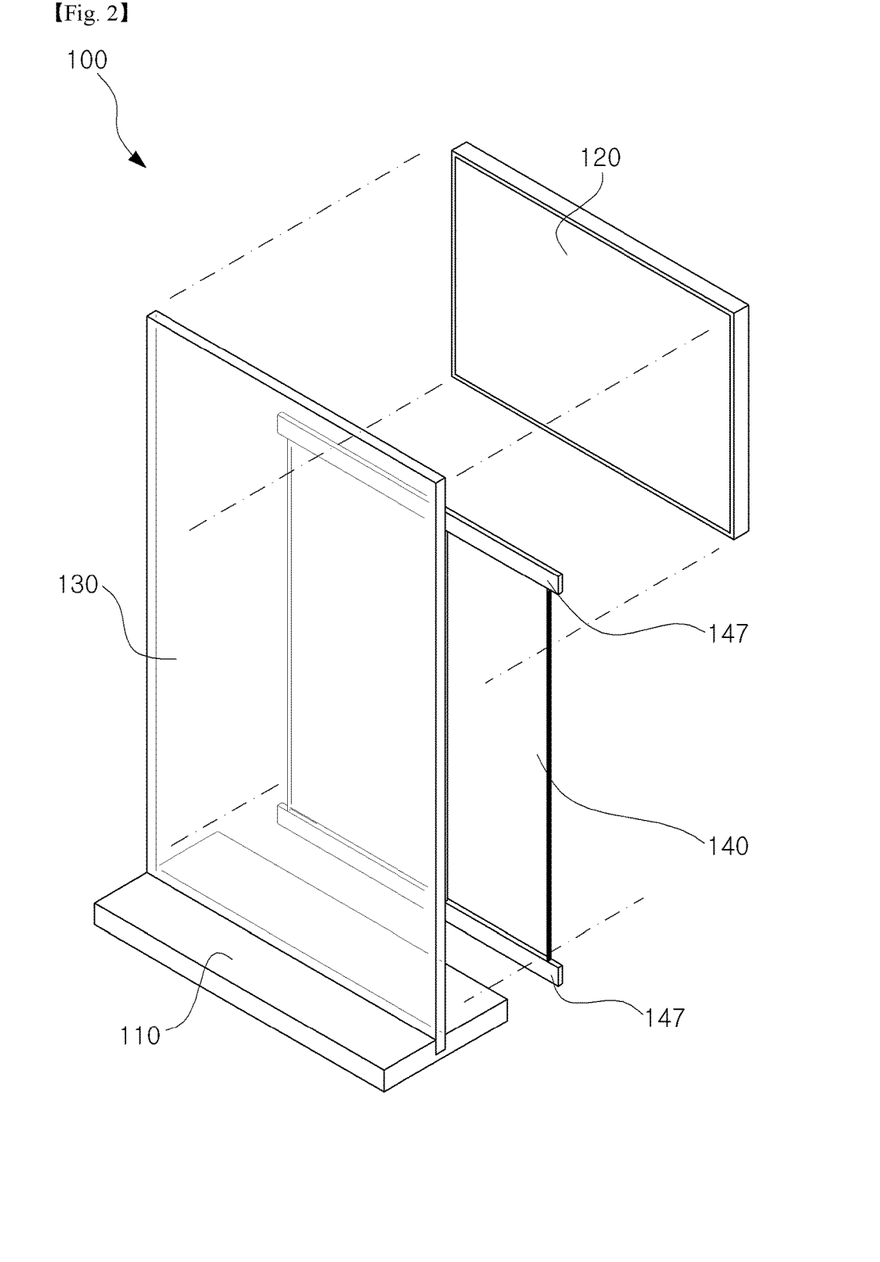
FIG. 2 is an exploded perspective view illustrating the display apparatus having levitation effect according to the embodiment of the present invention.
Figure 3:
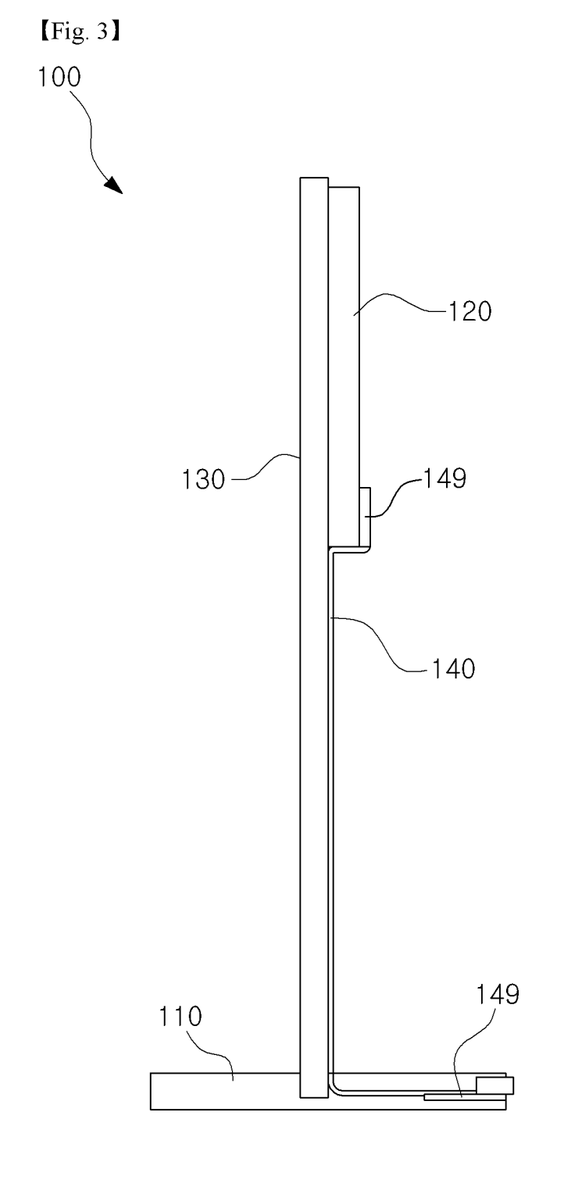
FIG. 3 is a side view illustrating the display apparatus having levitation effect according to the embodiment of the present invention.
Figure 4:
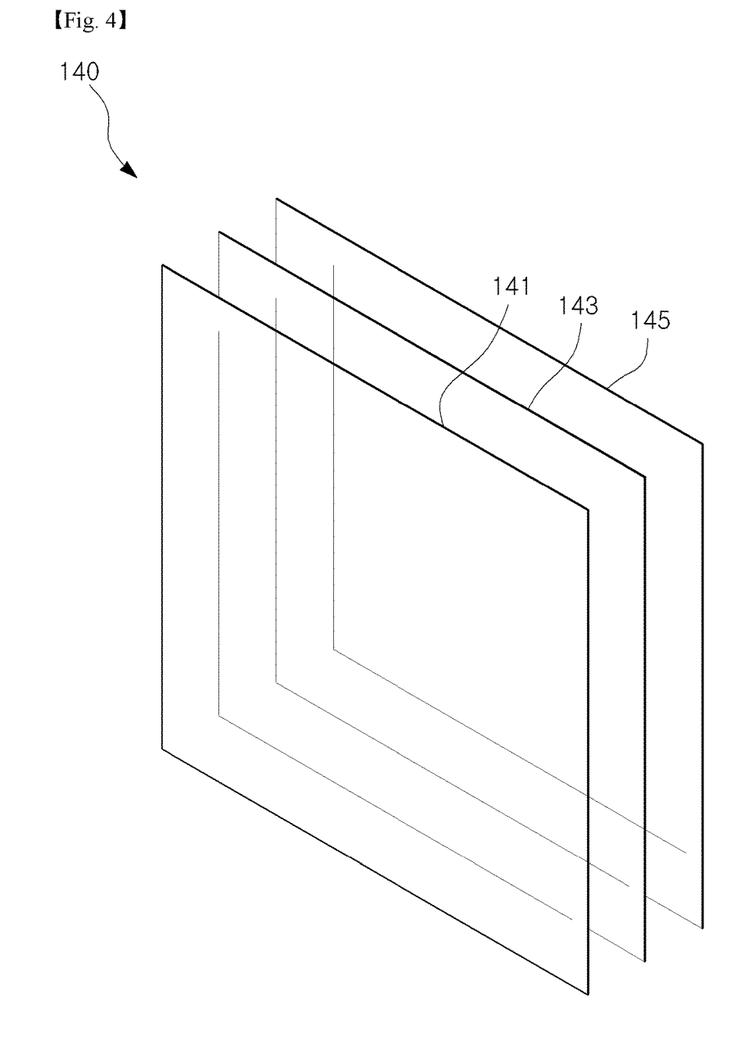
FIG. 4 is a perspective view illustrating a stacked state of a transparent electrode of the display apparatus having levitation effect according to the embodiment of the present invention.

As shown in FIGS. 1 to 3, a display apparatus having levitation effect 100 according to an embodiment of the present invention may include a panel support portion 110.

The display apparatus having levitation effect according to the embodiment of the present invention may be fixed to or supported on one of a side wall, a ceiling, and a floor by the panel support portion 110. In the embodiment, the panel support portion 110 is shown in a state of being supported on the floor.

Here, the side wall, the ceiling, or the floor may be an inner surface or outer surface of a building or may be an inner surface or outer surface of a structure to which the display apparatus 100 is installed.

A transmission panel 130 equipped with a display panel 120 to be described later may be vertically fixed to the panel support portion 110.

Meanwhile, the panel support portion 110 has a box shape having an empty inner portion as in the embodiment. The inner portion of the panel support portion 110 may accommodate connection substrates 149 having terminals connected to power lines, image signal lines, and the like provided to the display panel 120 from an external device to be described later.

The panel support portion 110 may have a plate shape or a shape having a structure in which the panel support portion 110 is easily fixed to the side wall, the ceiling, or the floor. Since the panel support portion 110 may have various shapes as long as being fixed to the side wall, the ceiling, or the floor in a state in which the transmission panel 130 is erected on the panel support portion 110, the shape of the panel support portion 110 is not limited.

As shown in FIGS. 1 to 3, the display apparatus having levitation effect 100 according to the embodiment of the present invention may include the display panel 120.

The display panel 120 may display various images such as a moving image and a still image. The display panel 120 may also include a speaker and output voice.

Meanwhile, the display panel 120 may be a finished TV or monitor, or may be a half-finished display panel.

In this case, the display panel 120 may include a panel portion and a drive circuit substrate for displaying an image. The panel portion and the drive circuit substrate for displaying the image may be separated from each other.

The display panel 120 may display an image in a state of being vertically spaced apart from the panel support portion 110.

Here, the display panel 120 may be downwardly spaced apart from the panel support portion 110 when the panel support portion 110 is supported by the ceiling, the display panel 120 may be inwardly or outwardly spaced apart from the side wall when the panel support portion 110 is installed to the side wall, and the display panel 120 may be upwardly spaced apart from the panel support portion 110 when the panel support portion 110 is supported by the floor.

As shown in FIGS. 1 to 3, the display apparatus having levitation effect 100 according to the embodiment of the present invention may include the transmission panel 130.

The transmission panel 130 may connects the panel support portion to the display panel 120 in a state of being vertically spaced apart from the panel support portion 110.

That is, a lower end portion of the transmission panel 130 may be fixed to the panel support portion 110, and the display panel 120 may be fixedly connected to an upper portion of the transmission panel 130 in a state of being vertically spaced apart from the panel support portion 110.

Here, the display panel 120 may be attached to one of a front surface and a rear surface of the transmission panel 130, but the display panel 120 is preferably attached to the rear surface viewed by a viewer in order to increase a sense of unity.

The transmission panel 130 may be formed of a plate made of a transparent material of glass or synthetic resin such as acrylic.

In addition, the transmission panel 130 has a larger width (a horizontal length) than a width (a horizontal length) of the display panel 120 or may also have the same width as that of the display panel 120.

An empty space of the transmission panel 130 between the display panel 120 and the panel support portion 110 may be a beam projection portion 131 on which an image projected by a beam projector 160 to be described later is projected.

Since an image other than the image displayed on the display panel is provided to the viewer by projecting the image on the beam projection portion 131 by the beam projector, the interest of the viewer and an event effect may be improved.

As shown in FIGS. 4 to 8, the display apparatus having levitation effect 100 according to the embodiment of the present invention may include a transparent electrode 140.

The transparent electrode 140 may provide power or signals for operating the display panel 120 levitated from the panel support portion 110 from the panel support portion 110 to the display panel 120, and may be made of a transparent material such that light is penetrated and visible.

Meanwhile, the transparent electrode 140 may have a transparent and flexible film and be formed with a conductive pattern 140a which is made of a conductive material such that current may flow in the transparent and flexible film and transmits power or signals.

Here, the conductive pattern 140a may be made of one conductive material of indium tin oxide (ITO), fluoride tin oxide (FTO), metal mesh, metal nanowire, carbon nanotube (CNT), conductive polymer, and graphene.

The conductive patter 140a may be formed on the transparent electrode 140 by various methods such as wet coating, sputtering, DIPS (Direct Injection Pyrolytic Synthesis), spin coating, spraying, roll to roll, and screen printing, according to characteristics of each conductive material.

Meanwhile, one end of the transparent electrode 140 may be located at the panel support portion 110, and the other end of the transparent electrode 140 may be located to the upper portion of the transmission panel 130 at which the display panel 120 is located.

Figure 5:
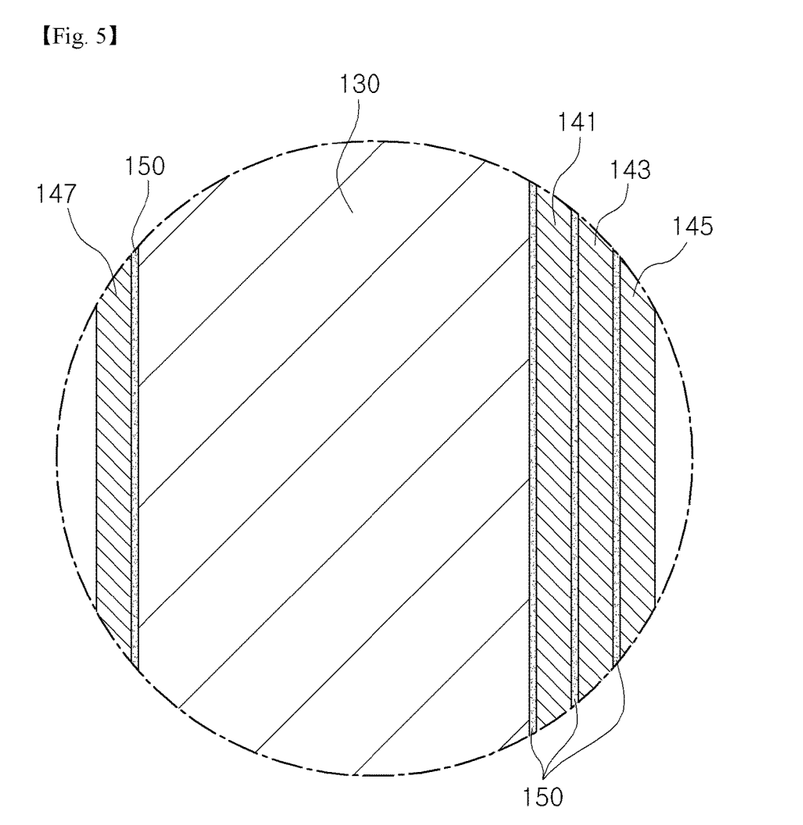
FIG. 5 is an enlarged cross-sectional view the transparent electrode of the display apparatus having levitation effect according to the embodiment of the present invention, and illustrates a state in which the transparent electrode is attached to a transparent panel.

In this case, the transparent electrode 140 may be entirely attached to the front or rear surface of the transmission panel 130 by a light transmission adhesive 150, or may be attached to a partial surface except for a portion, at which the display panel is located, by the light transmission adhesive 150 (see FIG. 5).

As such, since the transparent electrode 140 is partially or entirely attached to the surface of the transmission panel 130, more current may be transferred farther away. In addition, since the transparent electrode 140 is attached to the transmission panel 130, photorefraction is minimized. Consequently, a visual levitation effect may be further improved since attachment of the transparent electrode 140 to the transmission panel 130 is not easily visible from the outside.

In addition, the connection substrates 149, which have the terminals connected to connection lines such as power lines or signal lines for transmitting power and signals to drive the display panel 120 from the external device, may be bonded to one end and the other end of the transparent electrode 140 (see FIGS. 2 and 3).

Here, although one end of the transparent electrode 140 has been described to be located at the panel support portion 110 in the embodiment, one end of the transparent electrode 140 may further extend from the panel support portion 110 and extend to a portion at which the external device is located. The connection substrates 149 may also have terminals connected to existing connection lines.

Meanwhile, the transmission panel 130 may have a plate shape. Thereby, the transmission panel 130 may be easily damaged when the weight of the display panel 120 is increased due to increase in the size thereof. For this reason, in order to reduce the weight of the display panel 120, the display apparatus may also be configured such that only a panel portion for displaying an image in the display panel 120 is installed to the transmission panel 130 and the drive circuit substrate is installed to the panel support portion 110, so that the transparent electrode 140 connects the drive circuit substrate and the panel portion and the drive circuit substrate and the panel portion are operated.

In this case, the drive circuit substrate may also be the connection substrate 149 bonded to one end of the transparent electrode 140.

The transparent electrode 140 may include a plurality of electrodes 141, 143, 145, and 147.

For example, in the embodiment, the transparent electrode 140 may include a signal electrode 143 for transferring control and image signals, a power electrode 141 for supplying power, and a ground electrode 145 for performing the ground. The transparent electrode 140 may further include a touch electrode 147 for generating a touch signal as necessary (see FIG. 5).

All electrodes 141, 143, 145, and 147 may be realized as film forms having conductive patterns made of a conductive material. At least one of the electrodes 141, 143, 145, and 147 may be formed with a conductive pattern made of a different conductive material.

In addition, in the transparent electrode 140 of the embodiment, two or more electrodes of the power electrode 141, the signal electrode 143, and the ground electrode 145, and the touch electrode 147 may be stacked and bonded to each other by the light transmission adhesive 150, or may be pressurized in a heated state so as to be bonded in a laminating form.

In this case, when the transparent electrode 140 is configured so as to require a larger amount of current and transmit more signals since the display panel 120 is far away from the panel support portion 110, a plurality of electrodes performing the same function may also be stacked.

The light transmission adhesive 150 is transparent so as to penetrate light. The light transmission adhesive 150 may have adhesive properties so as to bond the stacked electrodes and have insulation properties so as to insulate a gap between the stacked electrodes.

Meanwhile, when the transparent electrode 140 includes a plurality of electrodes 141, 143, 145, and 147, at least one electrode may be attached to the front surface of the transmission panel 130 and the remaining electrodes may be attached to the rear surface of the transmission panel 130 (see FIG. 5).

Figure 6:
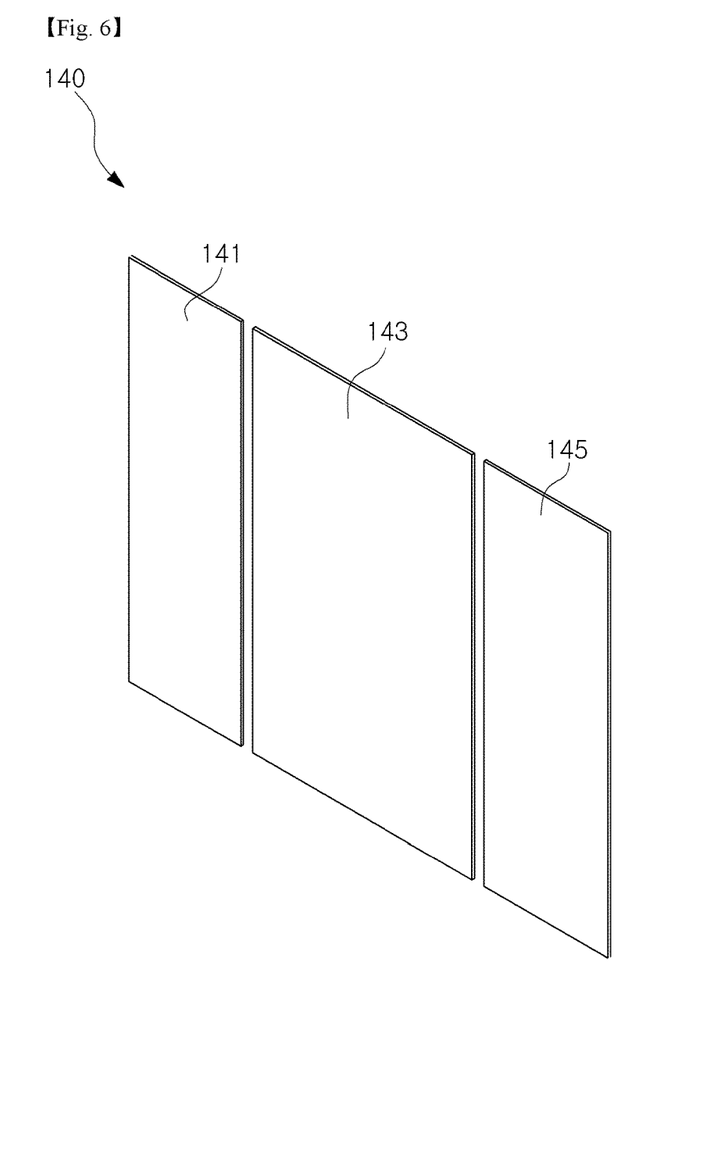
FIG. 6 is a perspective view illustrating a state in which the transparent electrode of the display apparatus having levitation effect according to the embodiment of the present invention is horizontally arranged.

In addition, when the transparent electrode 140 is configured of a plurality of electrodes 141, 143, 145, and 147, the electrodes 141, 143, 145, and 147 may be arranged parallel with each other in the horizontal direction of the display panel 120 and attached to the transmission panel 130 as shown in FIG. 6, instead of being stacked as in the embodiment.

Figure 7:
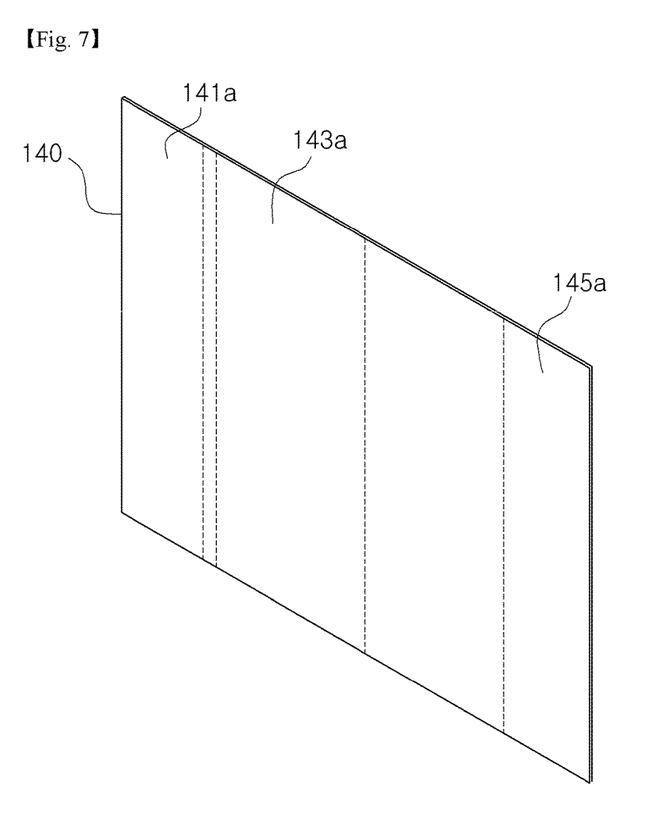
FIG. 7 is a perspective view illustrating a state in which a plurality of different patterns is formed on the transparent electrode of the display apparatus having levitation effect according to the embodiment of the present invention.

As shown in FIG. 7, the transparent electrode 140 may be configured such that a plurality of conductive patters is formed on one transparent electrode 140 in order to provide power and signals together and different functions are performed in one transparent electrode 140.

For example, when one of the plurality of conductive patterns 141a, 143a, and 145a is a conductive pattern 141a for supplying power, another may be a conductive pattern 143a for transmitting signals and the other may be a conductive pattern 145a for performing ground. As such, the transparent electrode 140 may be configured so as to perform different functions.

Figure 8:
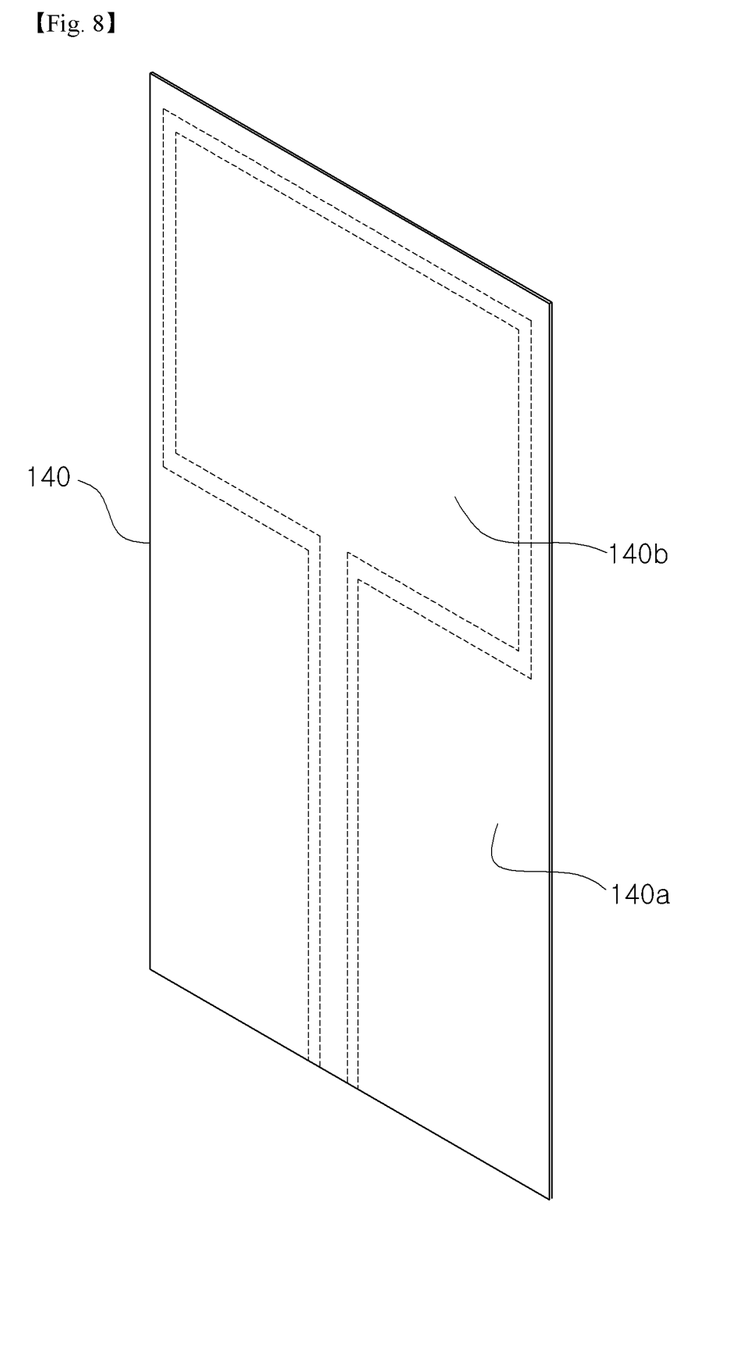
FIG. 8 is a perspective view illustrating a state in which a touch pattern is formed on the transparent electrode of the display apparatus having levitation effect according to the embodiment of the present invention.

As shown in FIG. 8, the transparent electrode 140 may include a touch pattern portion 140b. The touch pattern portion 140b may generate a touch signal and transmit the signal to the external device for controlling the display panel 120.

That is, as shown in FIG. 8, the conductive pattern 140a formed on the transparent electrode 140 is partially partitioned and the partitioned portion may be formed as the touch pattern portion 140b, such that the transparent electrode 140 performs a touch function together with an intrinsic function of transmitting power or signals.

In this case, when the transparent electrode 140 is configured of a plurality of electrodes, the touch pattern portion 140b may be formed on one of the plurality of electrodes. Since the touch electrode 147 and the touch pattern portion 140b perform the same function, installation of the touch electrode 147 may be omitted.

Figure 9:
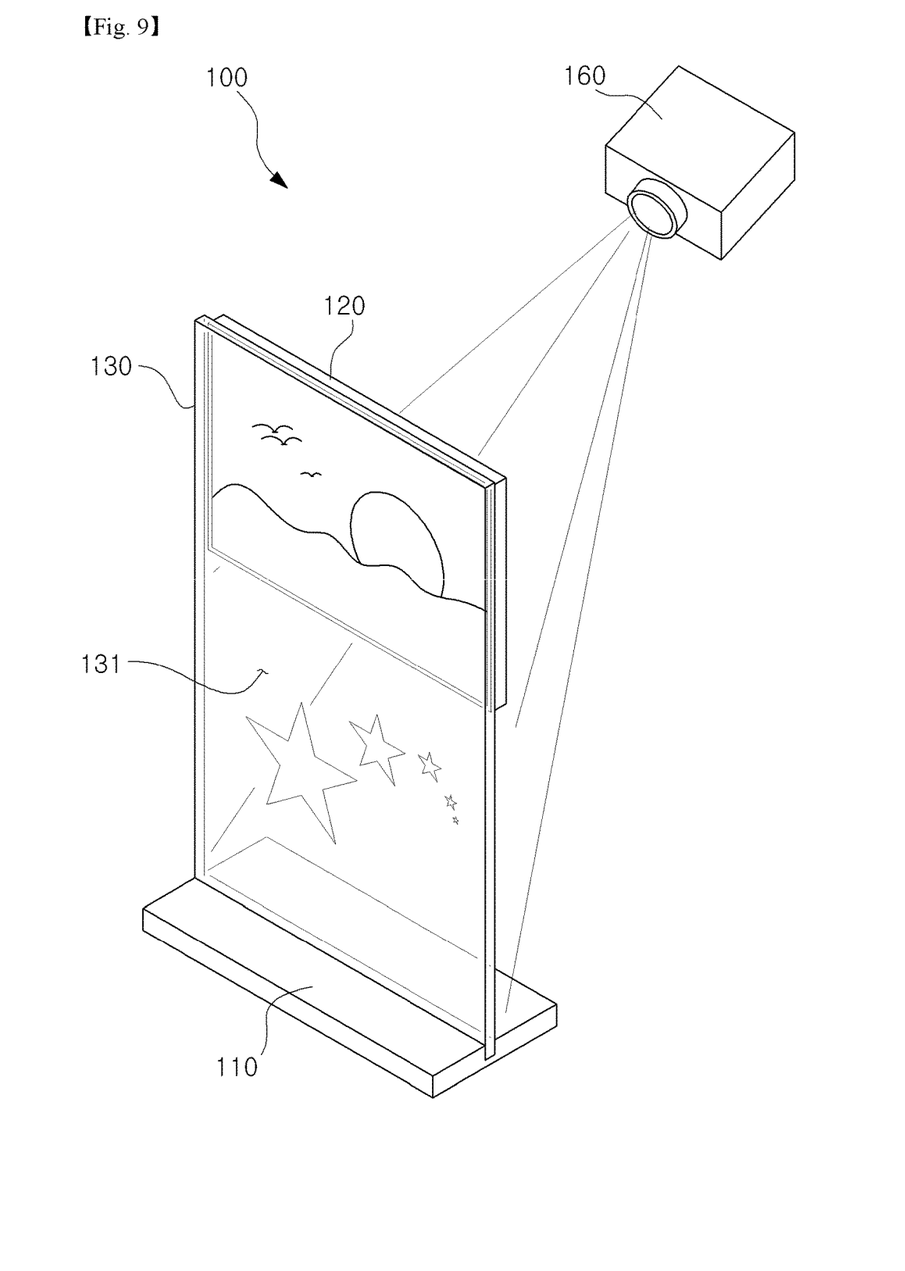
FIG. 9 is a perspective view illustrating a state in which an image is projected on a transmission panel of the display apparatus having levitation effect according to the embodiment of the present invention by a beam projector.

As shown in FIG. 9, the display apparatus having levitation effect 100 according to the embodiment of the present invention may include the beam projector 160.

The beam projector 160 projects an image with laser or an image module and the image may be projected on the beam projection portion 131 of the transmission panel 130.

Here, since the beam projector 160 is well known, detailed description thereof will be omitted.

Meanwhile, the beam projector 160 may project an image on an empty portion, particularly, the beam projection portion 131 of the transmission panel 140 at a distance away from the transmission panel.

As such, the beam projector 160 displays an image other than the image displayed on the display panel 120 using the empty portion of the transmission panel. Therefore, it may be possible to induce a viewer's eyes and improve a visual effect according to an event.

An operation and an effect of each component described above will be described.

In the display apparatus having levitation effect 100 according to the embodiment of the present invention, the transmission panel 130 is vertically installed to the panel support portion 110 and the display panel 140 is attached to the transmission panel 130 so as to be vertically spaced apart from the panel support portion 130.

The transparent electrode 140 extends to the panel support portion 110 from the portion to which the display panel 120 is installed, on one of the front and rear surface of the transmission panel 130, or is attached to the entirety of one surface of the transmission panel 130 by the light transmission adhesive 150.

In this case, the transparent electrode 140 may have a structure in which the electrodes are stacked and bonded by the light transmission adhesive 150.

One end of the transparent electrode 140 is connected to the connection substrate 149 which is connected to the signal lines for providing signals from the external device and the power line for supplying power from the outside.

In addition, the beam projector 160 is installed so as to project the image on the beam projection portion 131 of the transmission panel 130 at a portion away from the transmission panel 130.

The display apparatus having levitation effect 100 having such a configuration is installed such that the panel support portion 110 is fixed to or supported on one of the side wall, the ceiling, and the floor so as to levitate the display panel 120, and displays the image provided from the external device on the display panel, thereby enabling the viewer to view the image.

In this case, the display panel 120 is vertically spaced apart from the panel support portion 110 by the transmission panel 130 and the signals and power supplied to the display panel 120 are provided through the transparent electrode 140 attached to the transmission panel 130. Consequently, it may be possible to provide a visual impression as if the display panel 120 is levitated.

In addition, the image is displayed on the display panel 140 and the beam projector 160 projects another image on the portion of the transmission panel 130 through which light passes, namely, on the beam projection portion 131. Consequently, it may be possible to simultaneously provide the image displayed on the display panel 140, and an image other than the image to the viewer.

Accordingly, the display apparatus having levitation effect 100 according to the embodiment of the present invention attaches the transparent electrode 140 to the transmission panel 130 and drives the display panel 120 spaced apart from the floor. Consequently, it may be possible to prevent deterioration of an aesthetic appearance due to stretching of the complicated electric wires for driving of the display panel 120 and to improve exhibition and promotion effects. Particularly, when the present invention is used as a display apparatus of a game console, game concentration may be improved.

In addition, since the weight of the battery of the display apparatus 100 is reduced compared to a tablet type display apparatus having all of a battery for supplying power and a function of transmitting image signals by wireless, the display panel 120 may be more stably supported. In addition, since a large display panel 120 may be installed and the power is directly supplied from the outside, the image may be continuously displayed for 24 hours without a need for replacement or charging of the battery.

In addition, since the image signals are directly transferred from the image device and the image is displayed, instead that the image signals are not connected by wireless, it may be possible to prevent cut-off of the image due to the unstable wireless signals. In addition, since an existing display panel is easily applicable to the present invention, it may be possible to prevent increase in production cost required to develop a wireless image input/output board and firmware.

In addition, since the image is projected on the empty portion of the transmission panel 130 by the beam projector 160, the viewer's eyes may be concentrated and thus the exhibition and promotion effects and the event effect may be improved.

Various embodiments have been described in the best mode for carrying out the invention. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention is applicable to various display industrial fields for the purpose of game consoles, promotion, exhibition, advertisement, etc.

The invention claimed is:

1. A display apparatus having levitation effect, comprising:
   a panel support portion supported by one of a floor, a side wall, and a ceiling;
   a display panel vertically spaced apart from the panel support portion so as to display an image;
   a transmission panel made of a transparent material and connecting the display panel to the panel support portion such that a gap between the panel support portion and the display panel is penetrated and visible in a state in which the display panel is levitated; and
   a transparent electrode attached to the transmission panel and formed in a film form having electric conductivity which transmits power and signals for driving the display panel from the panel support portion and having light transmission which is penetrated and visible for a gap between the panel support portion and the display panel.

2. The display apparatus according to claim 1, wherein the transparent electrode comprises:
   a power electrode for supplying the power to the display panel; and
   a signal electrode for providing the signals to the display panel.

3. The display apparatus according to claim 2, wherein one of the power electrode and the signal electrode comprises a touch pattern portion which generates and transmits a touch signal during contact.

4. The display apparatus according to claim 2, wherein the power electrode and the signal electrode are formed in a film form, and are stacked and bonded by a light transmission adhesive.

5. The display apparatus according to claim 1, wherein the transparent electrode further comprises a ground electrode for grounding the display panel.

6. The display apparatus according to claim 5, wherein the ground electrode comprises a touch pattern portion which generates and transmits a touch signal during contact.

7. The display apparatus according to claim 5, wherein the ground electrode is formed in a film form, and is stacked and bonded by a light transmission adhesive.

8. The display apparatus according to claim 1, wherein the transparent electrode further comprises a touch electrode for generating a touch signal during contact with a portion, at which the display panel is installed, or the transmission panel.

9. The display apparatus according to claim 8, wherein the touch electrode is formed in a film form, and is stacked and bonded by a light transmission adhesive.

10. The display apparatus according to claim 1, wherein the transparent electrode is attached to the entirety of a remaining portion except for a portion to which the display panel is attached in the transmission panel or is attached to the entirety of one surface of the transmission panel, in order to increase an amount of current provided to the display panel.

11. The display apparatus according to claim 1, wherein the transparent electrode is made of one conductive material of indium tin oxide (ITO), fluoride tin oxide (FTO), metal mesh, metal nanowire, carbon nanotube (CNT), conductive polymer, and grapheme, and is formed with a conductive pattern.

12. The display apparatus according to claim 1, further comprising a beam projector which projects an image on a remaining portion except for a portion to which the display panel is attached in the transmission panel.

* * * * *